3,331,851
PREPARATION OF OXAZOLINES BY CYCLODE-
HYDROHALOGENATING N - (β - HALOETHYL)-
AMIDES
Taghi G. Bassiri, Morristown, N.J., assignor to Allied
Chemical Corporation, New York, N.Y., a corporation
of New York
No Drawing. Filed Apr. 22, 1965, Ser. No. 450,163
5 Claims. (Cl. 260—307)

This invention relates to a novel process for the preparation of 2-oxazoline and 2-substituted derivatives thereof. More particularly, this invention relates to a novel process for the preparation of 2-oxazoline and the 2-substituted derivatives thereof by the cyclodehydrohalogenation of N-(β-haloethyl)-amides in the presence of sodium carbonate.

Heretofore, 2-oxazoline and its 2-substituted derivatives such as 2-methyl-2-oxazoline have been prepared by the cyclodehydrohalogenation of N - (β - haloethyl)amides in solutions of sodium hydroxide or potassium hydroxide in water or water-alcohol mixtures. While this procedure gives a satisfactory product, its commercial feasibility is limited by the relatively low yields obtained and the expensive operations required to separate the desired product from the other components of the reaction mixture. In particular, where the product is water soluble such as 2-lower alkyl-2-oxazoline, it is quite expensive to separate the desired material from the large amounts of water present.

It is, therefore, an object of the present invention to provide an improved process for the preparation of 2-oxazoline and the 2-substituted derivatives thereof in high yields from N-(β-haloethyl)-amides.

Another object of this invention is to provide a process for the preparation of 2-oxazoline and the 2-substituted derivatives thereof, wherein the desired products are obtained separate from the bulk of the impurities in the reaction mixture and require relatively little further purification.

An additional object of this invention is to provide a process for the preparation of 2-oxazoline and the 2-substituted derivatives thereof, wherein the product obtained contains a minimum amount of water.

Other objects and advantages of this invention will be apparent from the following detailed description thereof.

In accordance with the present invention, N-(β-haloethyl)-amides of the formula

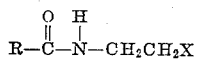

wherein R is a member selected from the group consisting of hydrogen; hydrocarbon radicals; halogenated hydrocarbon radicals; ether radicals composed of carbon, hydrogen and etheric oxygen; and the halogenated derivatives of said ether radicals; and X is either a chlorine or a bromine atom, are converted to 2-oxazolines of the formula

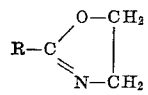

wherein R has the meaning given above, by reacting said amides with sodium carbonate in a reaction medium which initially is substantially devoid of water. When R is other than hydrogen, it is preferably an alkyl radical of 1 to 12 carbon atoms such as methyl, propyl, isobutyl, pentyl or hexyl; an aralkyl radical containing not more than 20 carbon atoms such as benzyl; an aryl radical containing not more than 20 carbon atoms such as phenyl; an etheric radical of the formula $R_1O—(R_2O)_n—R_3—$, wherein $R_1$ is a monovalent hydrocarbon or halogenated hydrocarbon group, $R_2$ and $R_3$ are divalent hydrocarbon or halogenated hydrocarbon groups, and $n$ is an integer of 0 to 1.

The cyclodehydrohalogenation reaction is carried out by admixing one of the above-defined haloamides with sodium carbonate and then subjecting said mixture to temperature and pressure conditions under which the oxazoline formed leaves the reaction mixture in vapor phase. These vapors are then removed from the reaction vessel and condensed to give a product containing a minimum of impurities. The reaction conditions employed vary with the particular 2-oxazoline being produced. In general, it is desirable to adjust the pressure in the system so that the 2-oxazolines boil at about 50° to 150° C., making it possible to distill off the product without using excessively high temperatures. The pressure employed is, of course, inversely proportional to the boiling point of the 2-oxazoline produced. Typical pressures which are suitable for practicing this invention are 50 mm. of mercury for 2-methyl-2-oxazoline and 5 mm. of mercury for 2-hexyl-2-oxazoline.

The sodium carbonate used in the present invention can be either anhydrous or the monohydrate, but the anhydrous is preferred. Any water present in the sodium carbonate distills over with the 2-oxazoline and should be separated therefrom. In determining which form of sodium carbonate to utilize, it is, therefore, a question of economics as to whether or not the lower cost of a hydrated form is offset by the increased cost of purification. Some water is formed during the cyclodehydrohalogenation reaction and distills over with the 2-oxazoline. This water can be removed by solvent extraction and/or fractional distillation. Additionally, the water can be removed with a drying agent such as calcium oxide. When, as in the case of 2-methyl-2-oxazoline, the 2-substituted-2-oxazoline forms an azeotrope with water, the water is best separated by means other than fractional distillation. The presence of any excess water increases the task of purifying the 2-oxazoline, particularly when the 2-oxazoline is water soluble. It is, therefore, undesirable to employ the sodium carbonate in the form of an aqueous solution, rather the sodium carbonate is admixed in the reaction mixture as a solid suspension. Preferably, about 0.5 to 3 mols of sodium carbonate are used per mol of N-(β-haloethyl)-amide. When the N-(β-haloethyl)-amide is produced by the chlorination of the corresponding N-(β-hydroxyethyl)-amide with thionyl chloride, it is sometimes feasible to add sodium carbonate directly to the reaction mixture without purifying the N-(β-haloethyl)-amide. In such a case, any unreacted thionyl chloride distills over as a forecut.

The 2-oxazolines prepared by the process of this invention can be used as solvents, since they have some unusual compatibilities, and for the same reason they serve as plasticizers for many kinds of resins. With variation in the type and size of the group attached to the ring nitrogen, they can be widely adapted for any type of plastic. Additionally, as disclosed in copending United States application Ser. No. 382,343 of Morton Litt, Taghi Bassiri and Alan Levy filed July 13, 1964, the 2-substituted-2-oxazolines can be polymerized, and the resulting polymers can be used in making films, fibers, molded products, paints, and adhesives.

The following examples are given to further illustrate the invention, but it is to be understood that the invention is not to be limited in any way by the details described therein. In each of Examples 1 to 7, the reaction was conducted in a glass flask equipped with a motor-driven stirrer and a conventional distillation head comprising a vapor take-off and a water-cooled product condenser. In Example 1, the 2-methyl-2-oxazoline prepared was separated from the water in the distillate produced by mixing with about 250 ml. of cumene in a separatory funnel, withdrawing the lower aqueous layer, then adding calcium hydride to the cumene layer, drawing off the liquid from the solid phase, and distilling. The 2-substituted - 2 - oxazolines of the other examples are more readily separated from water, and water removal was accomplished by fractional distillation.

*Example 1*

122 grams of N-(β-chloroethyl)acetamide and 70 grams of anhydrous sodium carbonate were admixed in a flask equipped with a mechanical stirrer and a distillation head. The pressure in the system was reduced to about 30 to 50 mm. of mercury and heating begun. When the temperature of the reaction mixture reached 65° C., 2-methyl-2-oxazoline and water began to distill. Heating was continued until dryness, at which time the temperature in the flask had reached 86° C. The distillate collected weighed 94 grams, of which 10% was water— the crude yield of 2-methyl-2-oxazoline thus being 99%.

After separation of the water by the above-described procedure, there were obtained 60 grams (70% yield) of 2-methyl-2-oxazoline having a boiling point of 110° C./760 mm. Hg.

*Example 2*

33 grams of N-(β-chloroethyl)-butyramide and 22 grams of anhydrous sodium carbonate were admixed in a flask equipped with a mechanical stirrer and a distillation head. The pressure in the system was reduced to 50 mm. and the reaction mixture was heated to about 110° C., at which temperature a mixture of 2-propyl-2-oxazoline and water began to distill. The distillation was continued at a temperature of about 110°–120° C. until the reaction mixture was dry. A total of 20 grams of distillate was collected, of which 11.3% was water. After separation of the water, there were obtained 17.74 grams (72% yield) of 2-propyl-2-oxazoline having a boiling point of 147° C./760 mm. Hg.

*Example 3*

100 grams of N-(β-chloroethyl)-isovaleramide and 80 grams of anhydrous sodium carbonate were admixed in a flask equipped with a mechanical stirrer and a distillation head. The pressure in the system was reduced to 50 mm. of mercury and the reaction mixture was heated to about 120° C., at which temperature a mixture of 2-isobutyl-2-oxazoline and water began to distill. The distillation was continued until the reaction mixture was dry, at which time the temperature in the reaction flask was 180° C. A total of 89 grams of distillate was collected of which about 8% was water. After separation of the water, there were obtained 81 grams (85% yield) of pure 2-isobutyl-2-oxazoline having a boiling point of 76° C. at 40 mm. Hg.

*Example 4*

89 grams of N-(β-chloroethyl)-heptoamide and 86 grams of anhydrous sodium carbonate were admixed in a flask equipped with a mechanical stirrer and a distillation head. The pressure in the system was reduced to about 5–10 mm. of mercury and the reaction mixture was heated at a temperature of 80°–110° C. until dry. A total of 63.5 grams of distillate was collected of which 7.3% was water. After separation of the water, there was obtained a 97% yield of pure 2-hexyl-2-oxazoline having a boiling point of 71° C. at 3 mm. of Hg.

*Example 5*

329 grams of N-(β-chloroethyl)-octanamide and 130 grams of anhydrous sodium carbonate were admixed in a flask equipped with a mechanical stirrer and a distillation head. The pressure in the system was then reduced to about 2 mm. of mercury and the reaction mixture heated to a temperature of 92° C. With continued heating at 92° C. at a pressure of 0.5 to 2 mm., there was obtained a distillate containing 246 grams of 2-heptyl-2-oxazoline.

*Example 6*

346 grams of N-(β-hydroxyethyl)-ethoxyacetamide were converted to N-(β-chloroethyl)-ethoxyacetamide by reaction with 310 grams of thionyl chloride for one hour at 10–20° C. using 400 ml. of ethyl ether as a diluent. The resulting reaction mixture was transferred to a flask equipped with a mechanical stirrer and a distillation head and 265 grams of anhydrous sodium carbonate were added. The pressure in the system was reduced to 14.5 mm. of Hg and the reaction mixture heated. The ether and the unreacted thionyl chloride distilled over first and were separated. Crude 2-ethoxymethyl-2-oxazoline was obtained as a distillate at a temperature of about 74.5° C. After purification by redistillation, there were obtained 198.5 grams (64.2% yield) of water-white pure 2-ethoxymethyl-2-oxazoline having a boiling point of 72° C. at 12 mm. Hg.

*Example 7*

248 grams of N-(β-hydroxyethyl)-methoxyethoxy-acetamide were placed in a flask equipped with a thermometer, an addition funnel, and a reflux condenser over a period of one hour. 183 grams of thionyl chloride were added dropwise while controlling the reaction temperature between —5° C. and 10° C. The reaction mixture was stirred for an additional 4 hours at a temperature of about 0° C. following which 159 grams of anhydrous sodium carbonate were added.

The reaction mixture was then transferred to the vacuum distillation equipment. The ether and unreacted thionyl chloride were distilled off and the pressure in the system was reduced. Crude 2-[(methoxyethoxy)methyl]-2-oxazoline was distilled at 86°–104° C./0.7–2.2 mm. of Hg. This product weighed 183.5 grams, representing a crude yield of 82.6%. The 2-[(methoxyethoxymethyl]-2-oxazoline was purified by fractional distillation at 0.5 mm. Hg. 181 grams of product were obtained having a boiling point of 65°–67° C. per 0.5 mm. Hg.

It will be apparent that many modifications and variations may be effected without departing from the scope of the novel concepts of the present invention and the illustrative details disclosed are not to be construed as imposing undue limitations on the invention.

I claim:
1. A process for the preparation of oxazolines of the formula

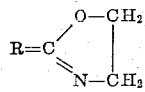

wherein R is a member selected from the group consisting of hydrogen; hydrocarbon radicals; halogenated hydrocarbon radicals; ether radicals composed of carbon, hydrogen and etheric oxygen and halogenated derivatives of said ether radicals, said process comprising admixing an amide of the formula

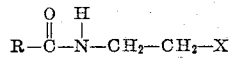

wherein R has the meaning given above and X is a member selected from the group consisting of chlorine and bromine, with sodium carbonate to form a reaction mixture which is substantially devoid of liquid water, and heating said reaction mixture under conditions of temperature and pressure at which the desired oxazoline of the above formula is distilled from the reaction mixture.

2. A process as claimed in claim 1 wherein R is a radical of the formula $R_1O$—$(R_2O)_n$—$R_3$— wherein $R_1$ is a member selected from the group consisting of monovalent hydrocarbon and halogenated hydrocarbon radicals; $R_2$ and $R_3$ are members selected from the group consisting of divalent hydrocarbon and halogenated hydrocarbon radicals, and $n$ is an integer of from 0 to 1.

3. A process as claimed in claim 1 wherein R is an alkyl radical of 1 to 12 carbon atoms.

4. A process as claimed in claim 1 wherein said pressure is adjusted so that the oxazoline prepared distills at a temperature of from about 50° to 150° C.

5. A process as claimed in claim 1 wherein about 0.5 to 3 moles of sodium carbonate are used per mole of said amide and said sodium carbonate is present in said reaction mixture as solid particles until reaction with said amide.

References Cited

Gabriel et al.: Berichte, vol. 233 (1890), p. 2495.

Leffler et al.: J. Am. Chem. Soc., vol. 59 (1937), p. 2256.

ALEX MAZEL, *Primary Examiner.*

HENRY R. JILES, *Examiner.*

R. J. GALLAGHER, *Assistant Examiner.*